C. A. JUENGST.
PAMPHLET COVERER.
APPLICATION FILED SEPT. 26, 1913.

1,244,861.

Patented Oct. 30, 1917.
15 SHEETS—SHEET 3.

Fig. 3

WITNESSES:
Harry E. McGill
Teresa V. Lynch

INVENTOR
Charles A. Juengst
BY
Fred W. Becker
ATTORNEY

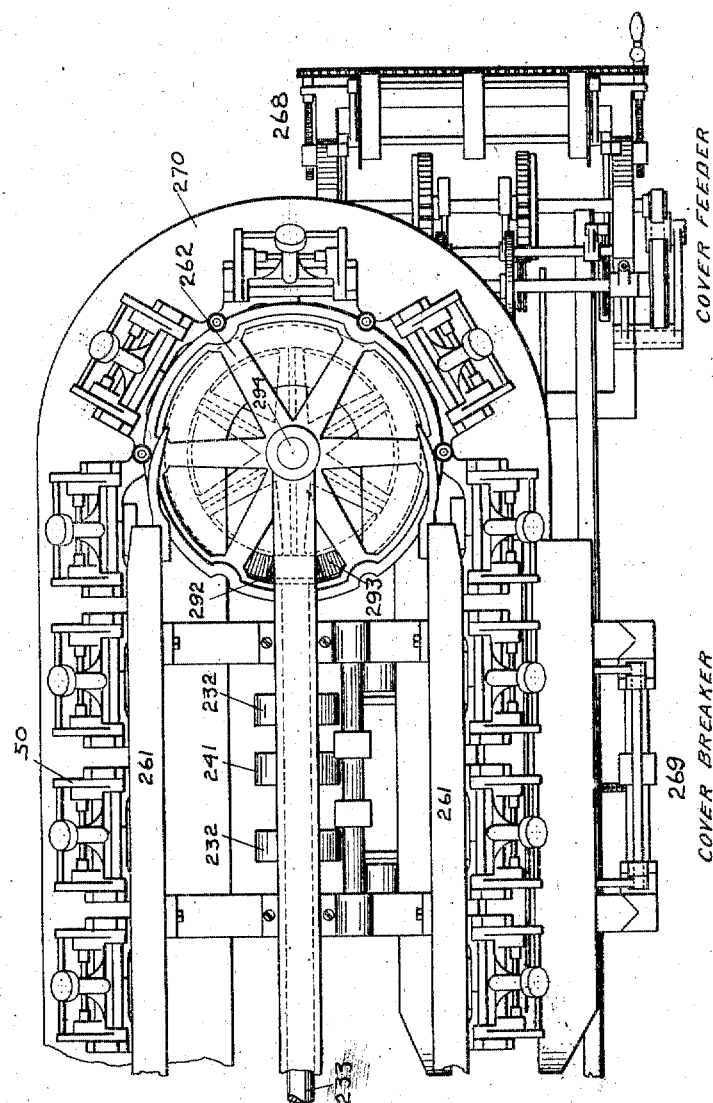

C. A. JUENGST.
PAMPHLET COVERER.
APPLICATION FILED SEPT. 26, 1913.
1,244,861.
Patented Oct. 30, 1917.
15 SHEETS—SHEET 5.
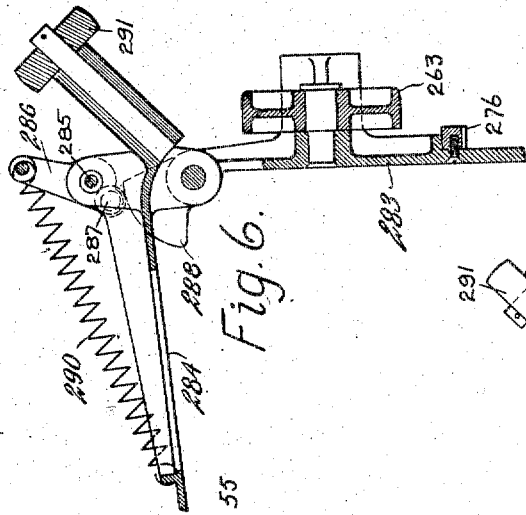
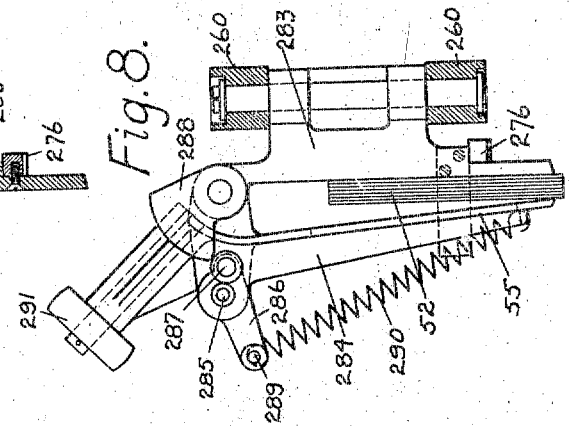
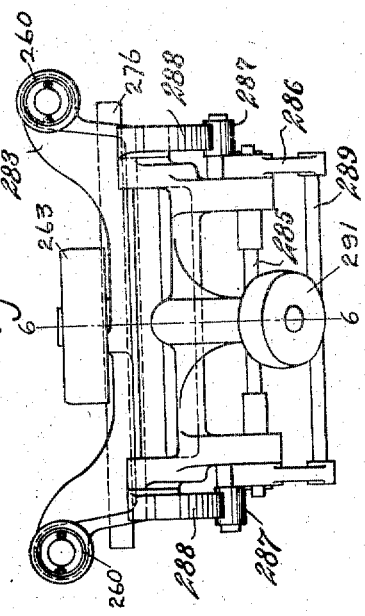
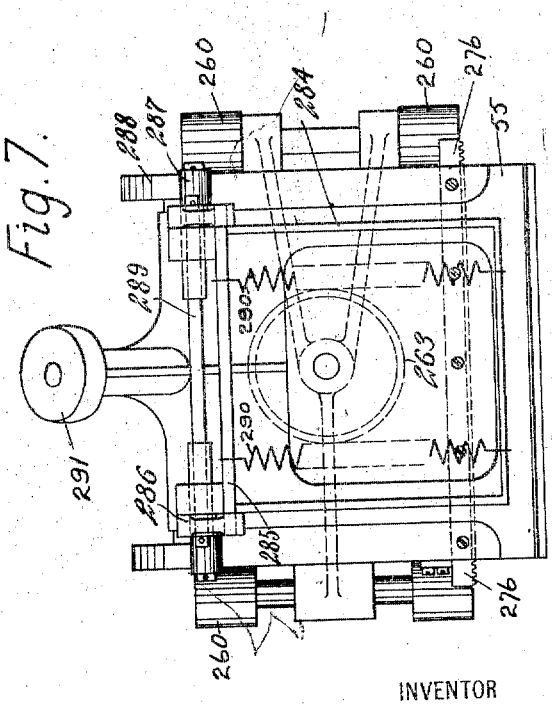
WITNESSES:
Harry E. McGill
Teresa V. Lynch
INVENTOR
Charles A Juengst
BY
Axel V Beeken
ATTORNEY

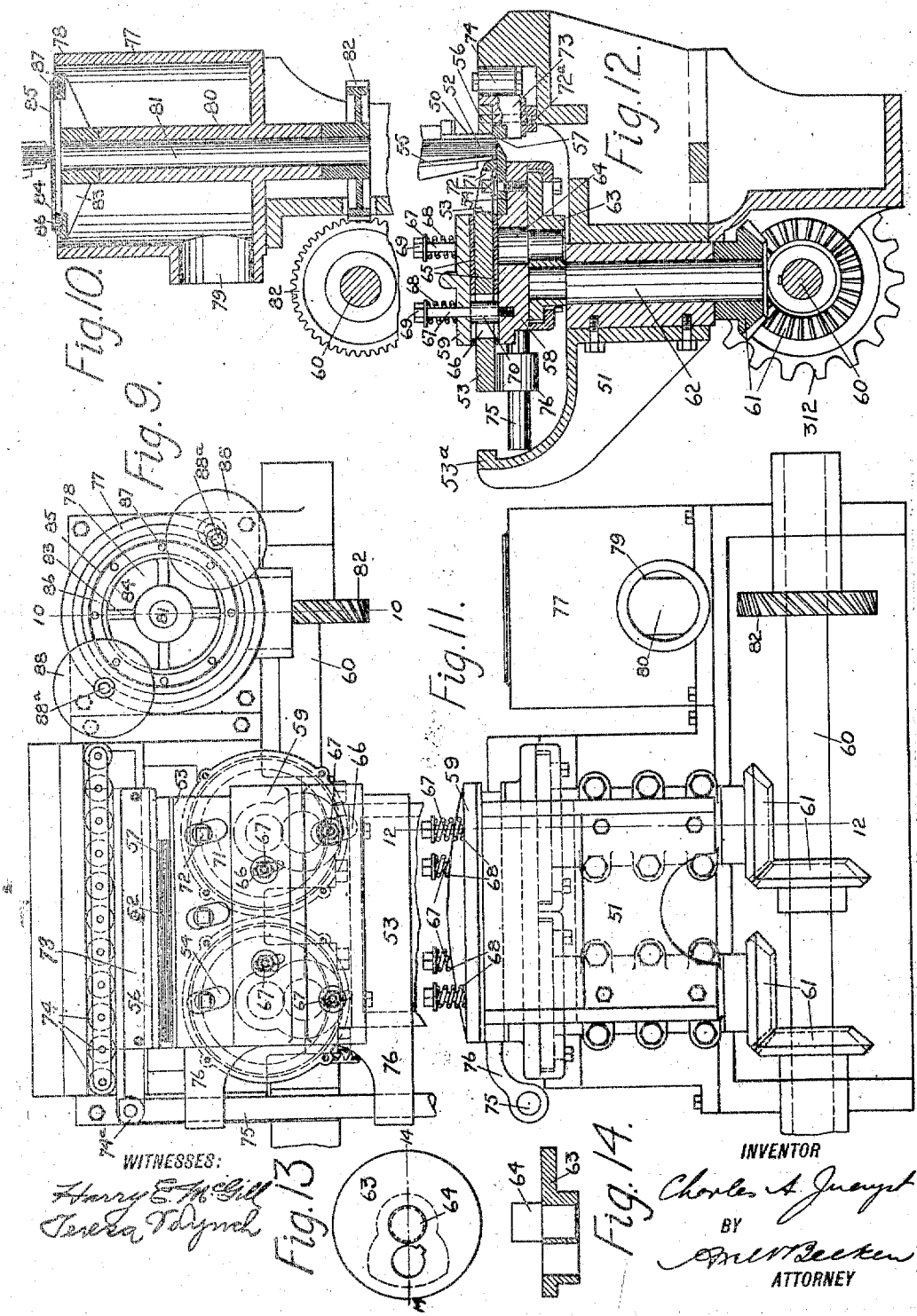

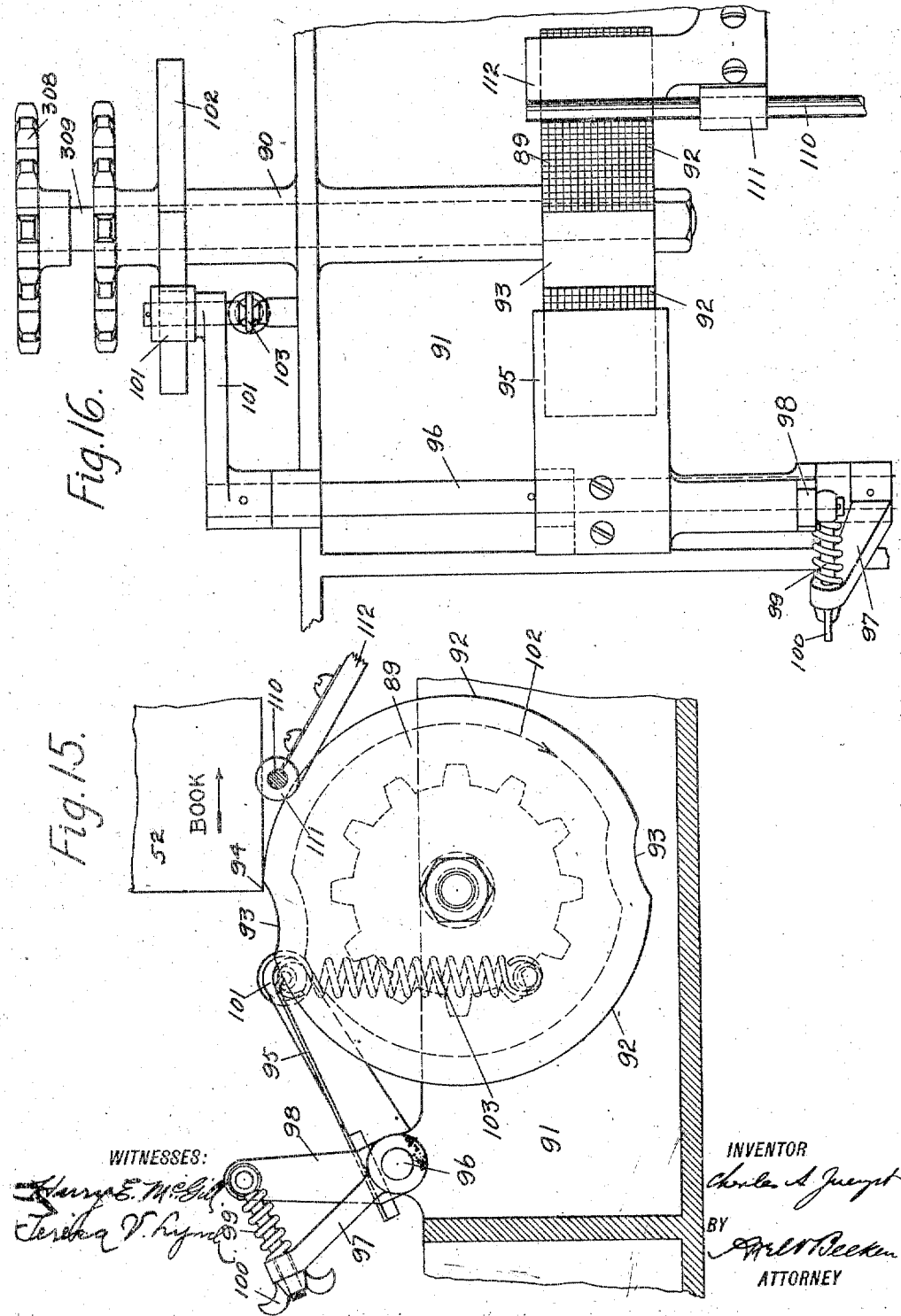

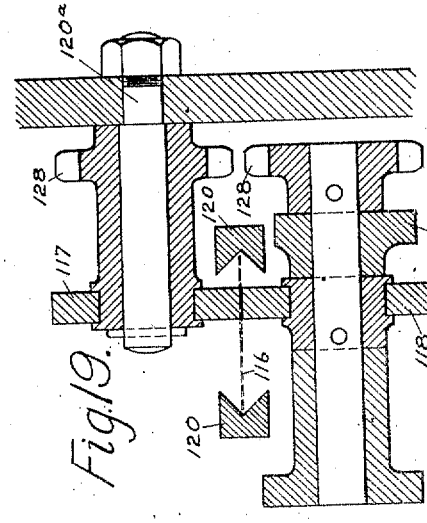

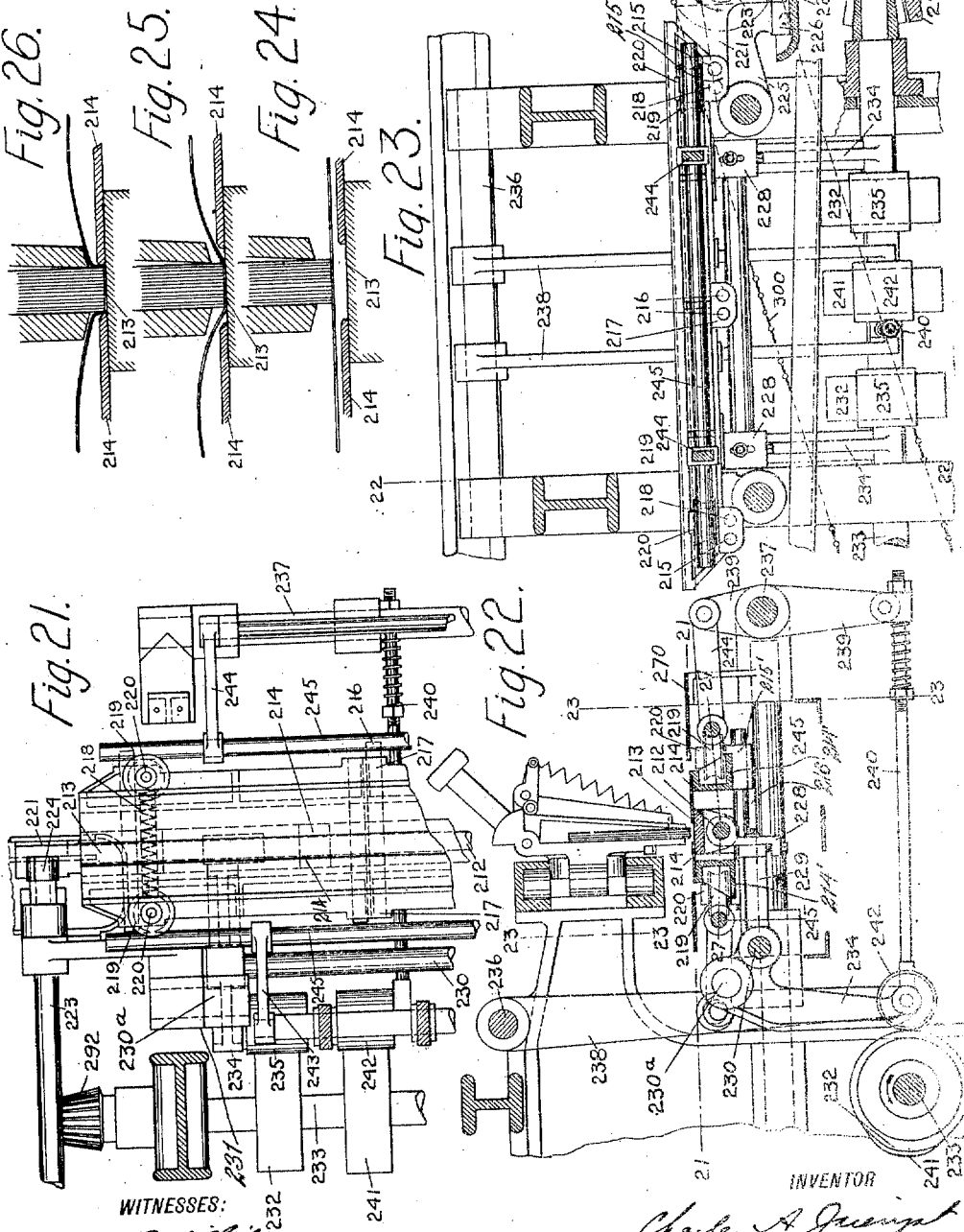

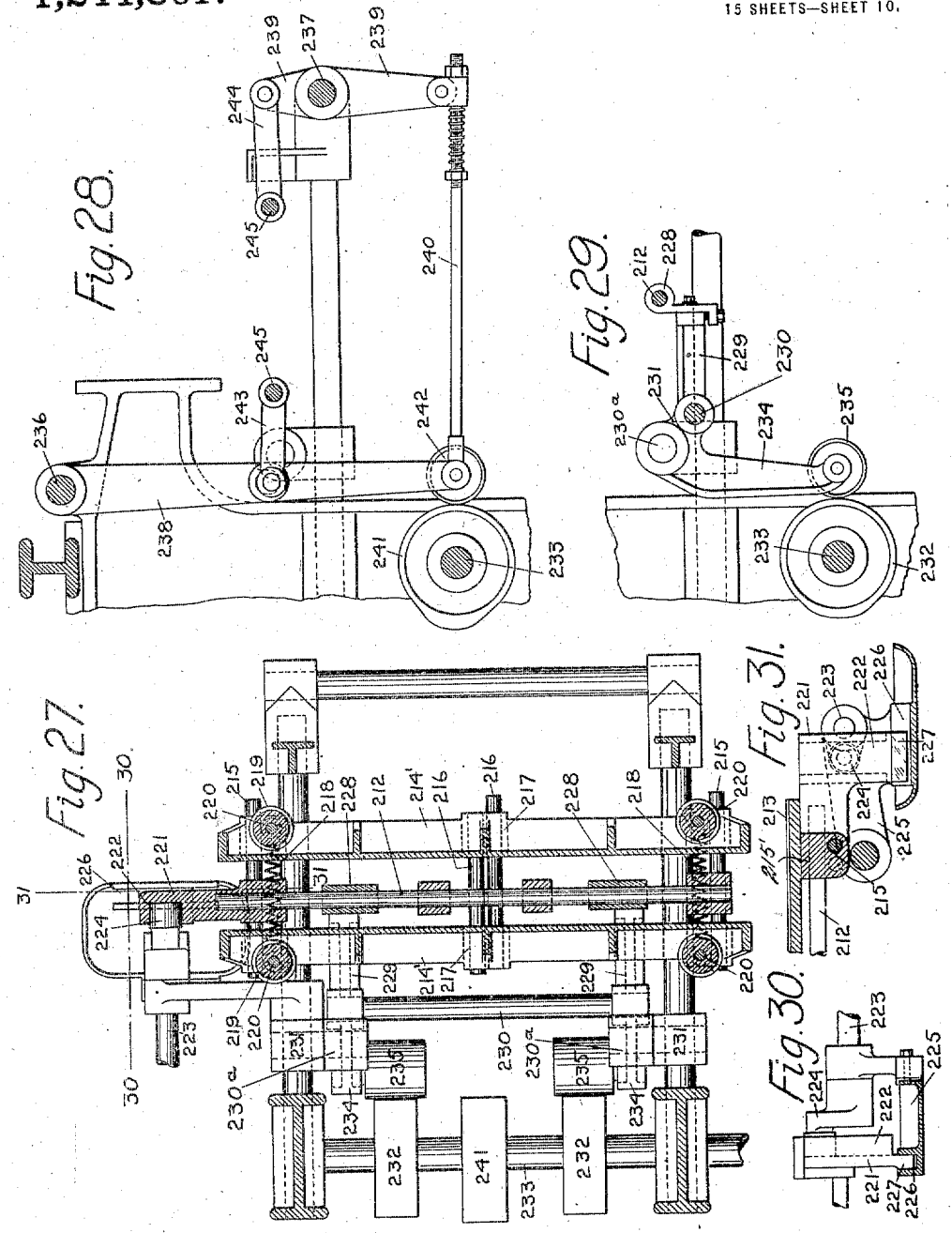

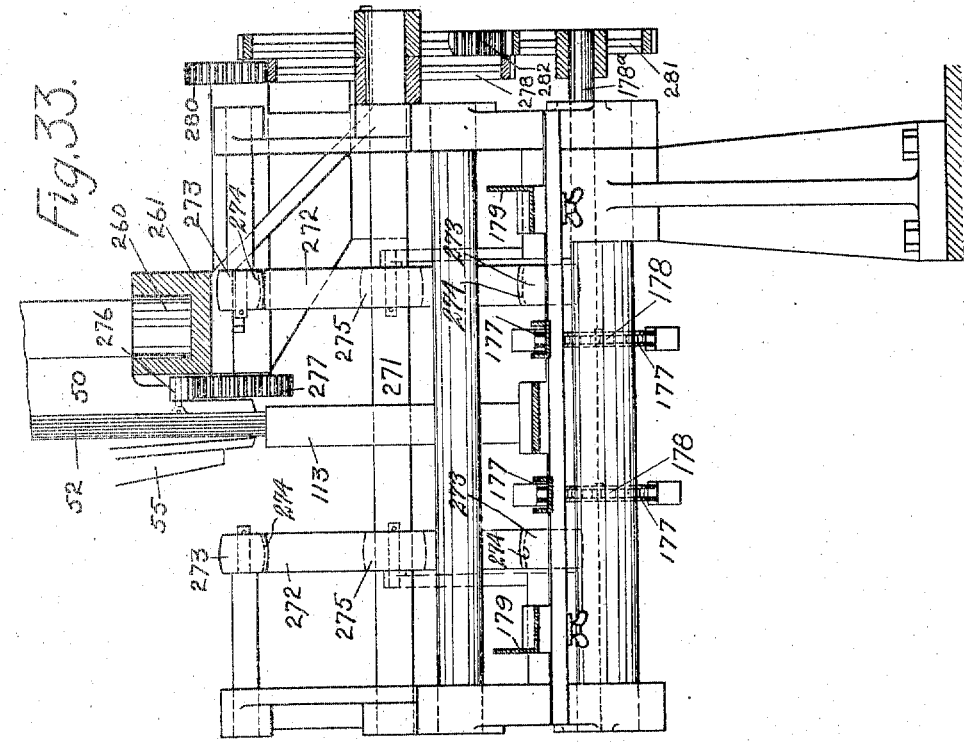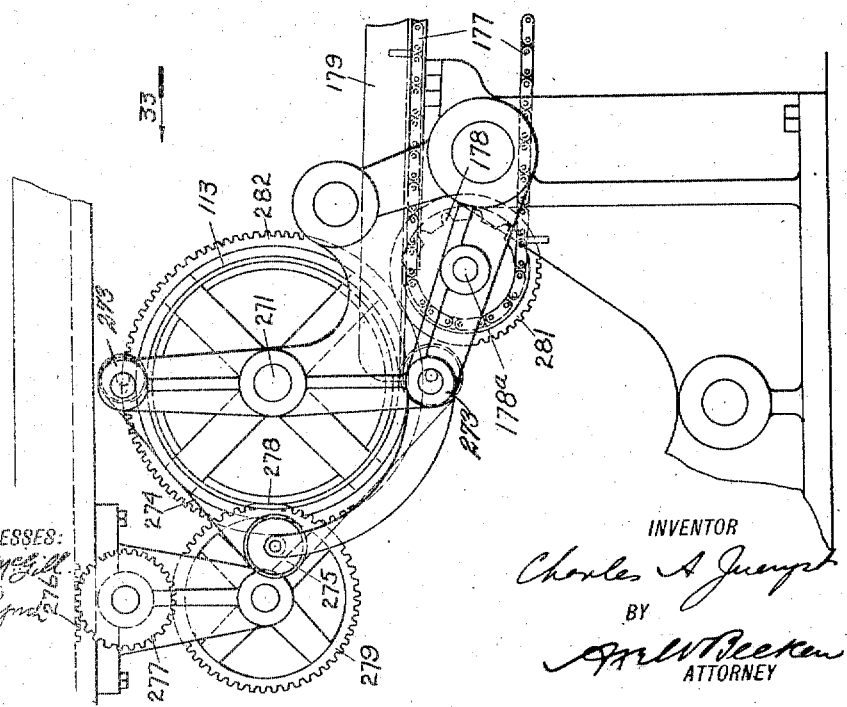

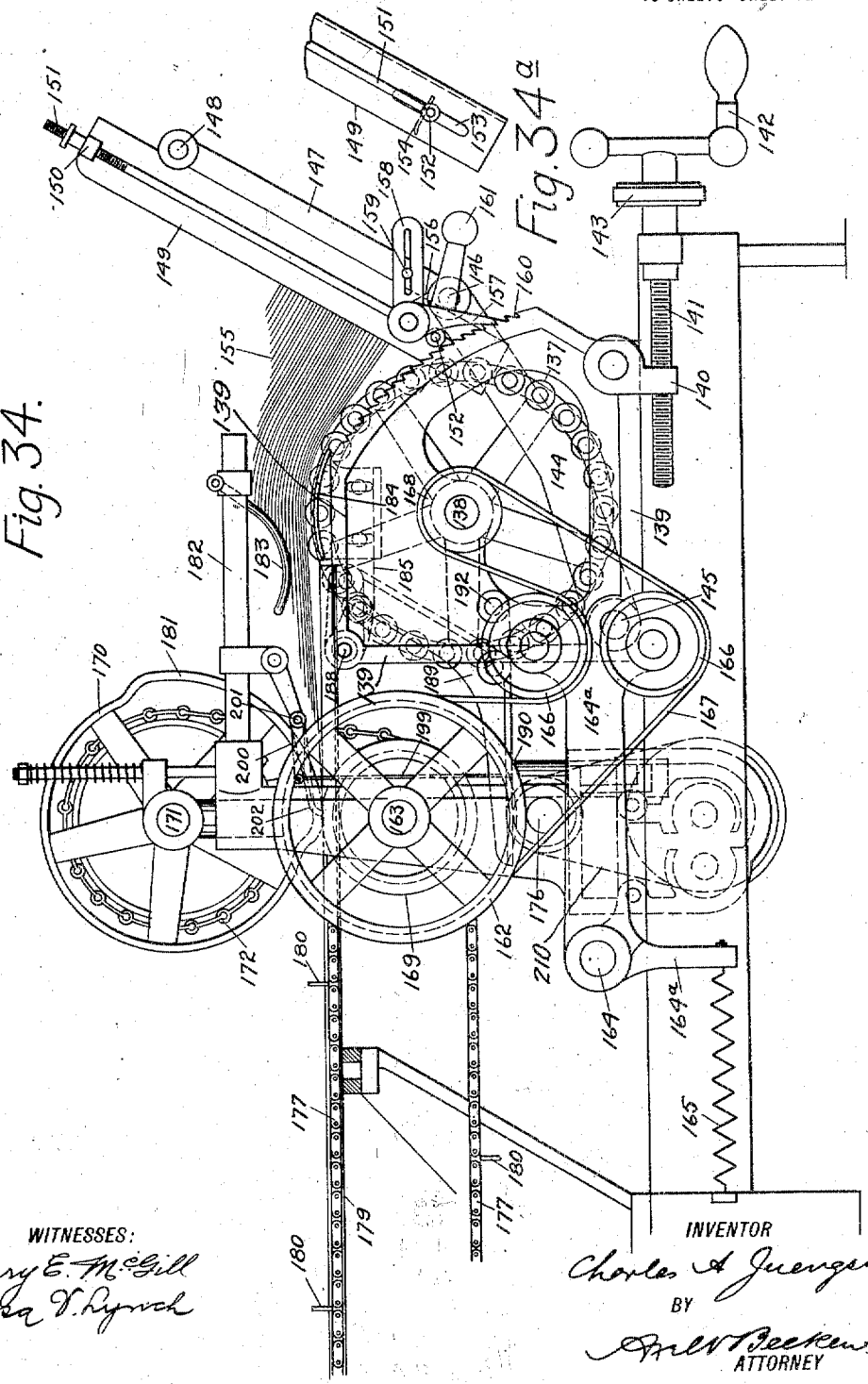

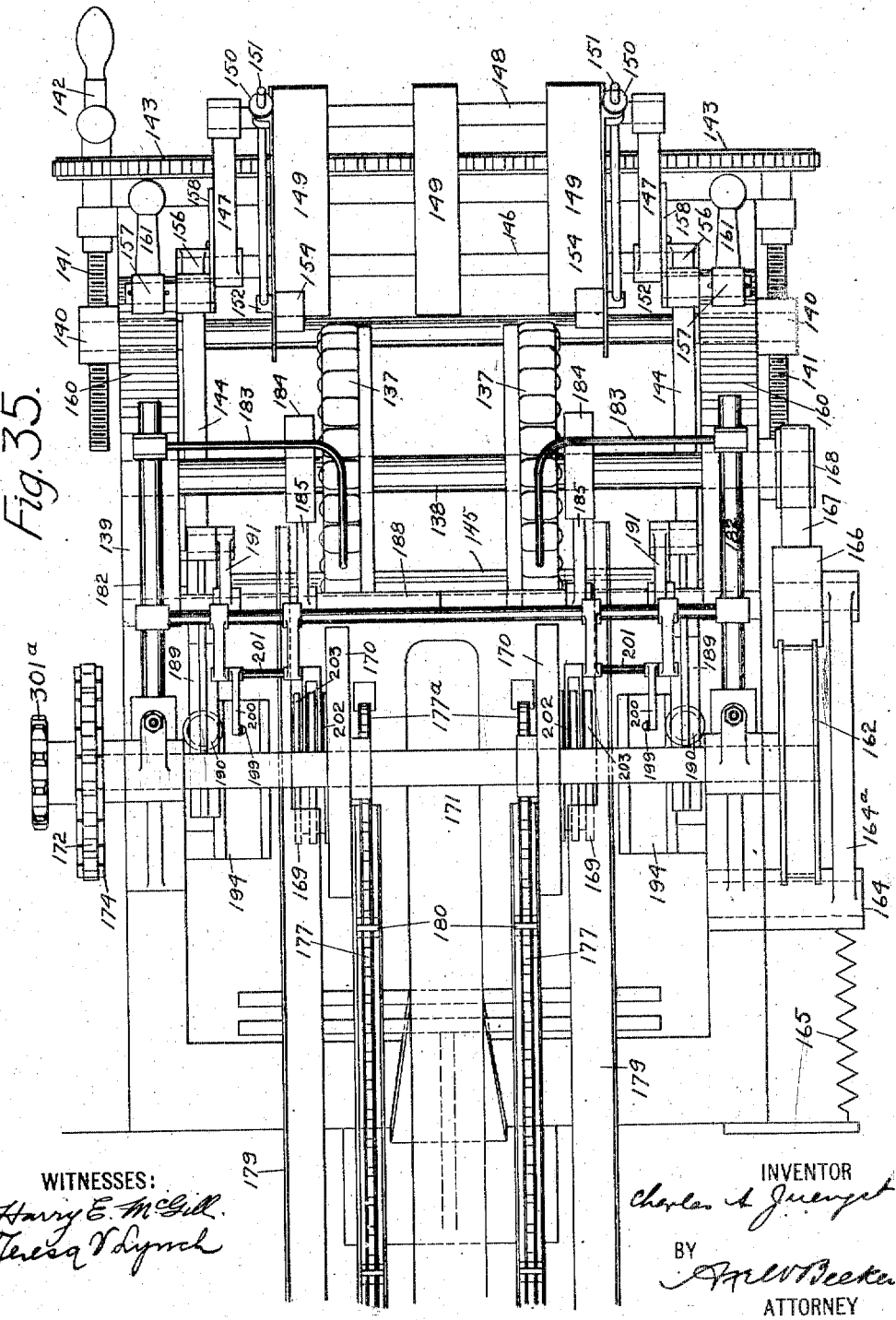

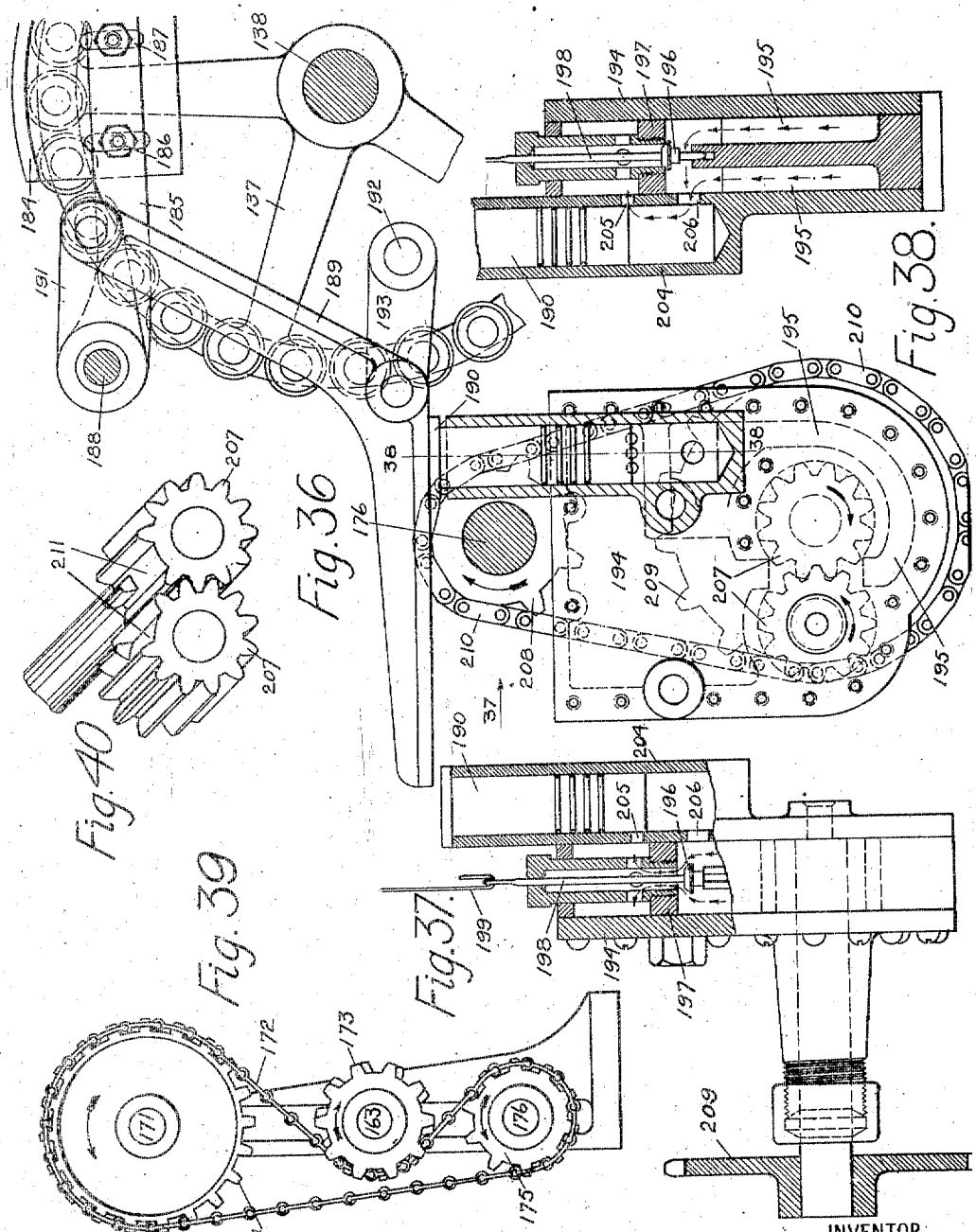

C. A. JUENGST.
PAMPHLET COVERER.
APPLICATION FILED SEPT. 26, 1913.
1,244,861.
Patented Oct. 30, 1917.
15 SHEETS—SHEET 15.
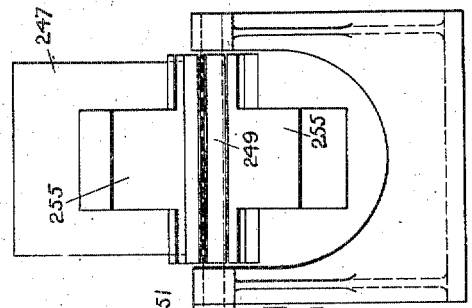
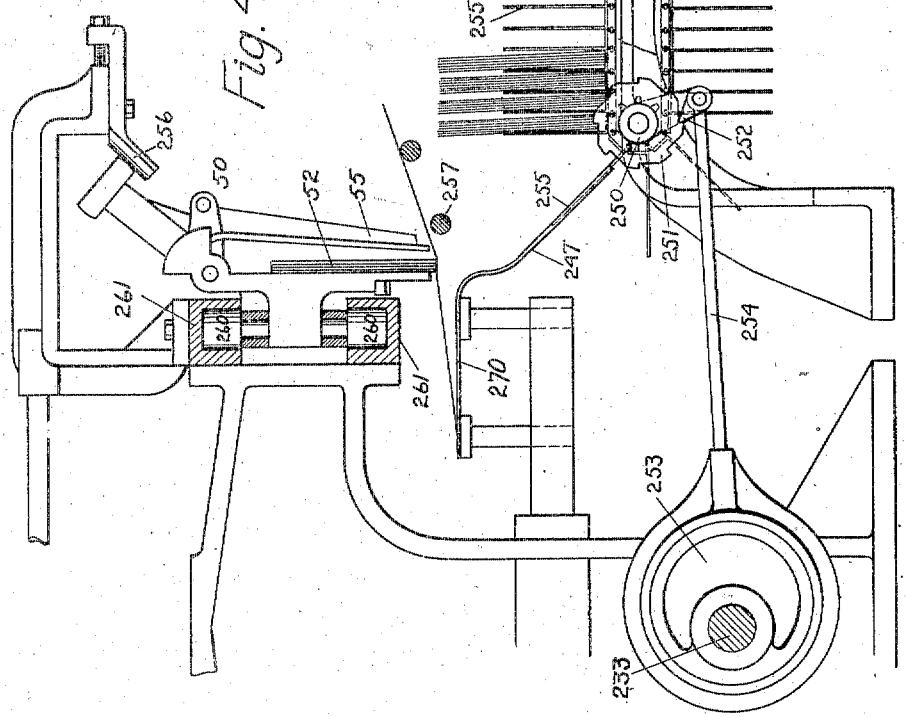
WITNESSES:
Harry E. McGill.
Teresa V. Lynch.
INVENTOR
Charles A. Juengst
BY
Becker
ATTORNEY

UNITED STATES PATENT OFFICE.

CHARLES A. JUENGST, OF CROTON FALLS, NEW YORK, ASSIGNOR, BY MESNE ASSIGNMENTS, TO AMERICAN ASSEMBLING MACHINE COMPANY, A CORPORATION OF DELAWARE.

PAMPHLET-COVERER.

1,244,861.  Specification of Letters Patent.  Patented Oct. 30, 1917.

Application filed September 26, 1913. Serial No. 791,942.

*To all whom it may concern:*

Be it known that I, CHARLES A. JUENGST, a citizen of the United States, and a resident of Croton Falls, in the county of Westchester and State of New York, have invented certain new and useful Improvements in Pamphlet-Coverers, of which the following is a specification.

The present invention relates generally to book covering machines, and has for its main object the provision of means whereby the book to be covered may have the back cut off and roughened, an adhesive applied to the back, a reinforcing strip attached to the back, and a cover applied, all while the book is traveling continuously.

This invention is an improvement upon the invention disclosed in Letters Patent of August 1, 1916, No. 1,193,395. In that case the cover is preferably applied to a book which has been stitched.

In the accompanying drawings the invention is disclosed in a concrete and preferred form, but changes of construction may be made without departing from the legitimate and expressed scope of the claims.

In the said drawings:

Figs. 3 and 4 are plan views which, when placed together, form a complete plan view of a machine embodying the invention.

Fig. 5 is a detail plan view of one of the book clamps which constitute one of the links of the endless conveyer.

Fig. 6 is a vertical sectional view on the line 6—6 of Fig. 5, showing the book clamp in its open position.

Fig. 7 is a side elevation of Fig. 5.

Fig. 8 is an end elevation of Fig. 7, with one of the hinges shown in section, and with the clamp in its closed position.

Fig. 9 is a plan view of the paper cutting attachment and of the back roughening device for the books.

Fig. 10 is a vertical sectional view on the line 10—10 of Fig. 9.

Fig. 11 is a side elevation of the paper cutting and roughening devices shown in Fig. 9.

Fig. 12 is a sectional view of the paper cutting device on the line 12—12 of Fig. 11.

Fig. 13 is a plan view of one of the crank disks used in connection with the paper cutting device.

Fig. 14 is a sectional view of the same on the line 14—14 of Fig. 13.

Fig. 15 is a detail view of one of the glue rollers, with a section through the glue pot.

Fig. 16 is a plan view of the parts shown in Fig. 15.

Fig. 17 is a side elevation of the crash feed device and cover drum.

Fig. 18 is a plan view of the crash feed device shown in Fig. 17.

Fig. 19 is a detail sectional view on the line 19—19 of Fig. 17.

Fig. 20 is an end view of the parts shown in Fig. 17, looking in the direction of the arrow 20.

Fig. 21 is a broken plan view, partly in section, on the line 21 of Fig. 22, showing parts of the cover breaking device.

Fig. 22 is a vertical transverse sectional view through the cover breaking device on the line 22—22 of Fig. 23.

Fig. 23 is a vertical longitudinal sectional view on the lines 23—23 of Fig. 22.

Figs. 24, 25 and 26 are diagrammatic views illustrating the different stages of breaking the cover of the book.

Fig. 27 is a horizontal sectional view on the line 27—27 of Fig. 22.

Fig. 28 is a detached view of the connections for moving the cover breakers toward each other.

Fig. 29 is a detached view of the device for lifting the cover breaker.

Fig. 30 is a detail sectional view on the line 30—30 of Fig. 27.

Fig. 31 is a detail sectional view on the line 31—31 of Fig. 27, with the crank revolved one-quarter turn from the position shown in Fig. 30.

Fig. 32 is a detail view in elevation of the cover feed drum and adjacent elements.

Fig. 33 is a vertical transverse sectional view, looking in the direction of the arrow 33, of Fig. 32, with parts broken away and in section.

Fig. 34 is a side elevation of the cover feeding device.

Figure 1:
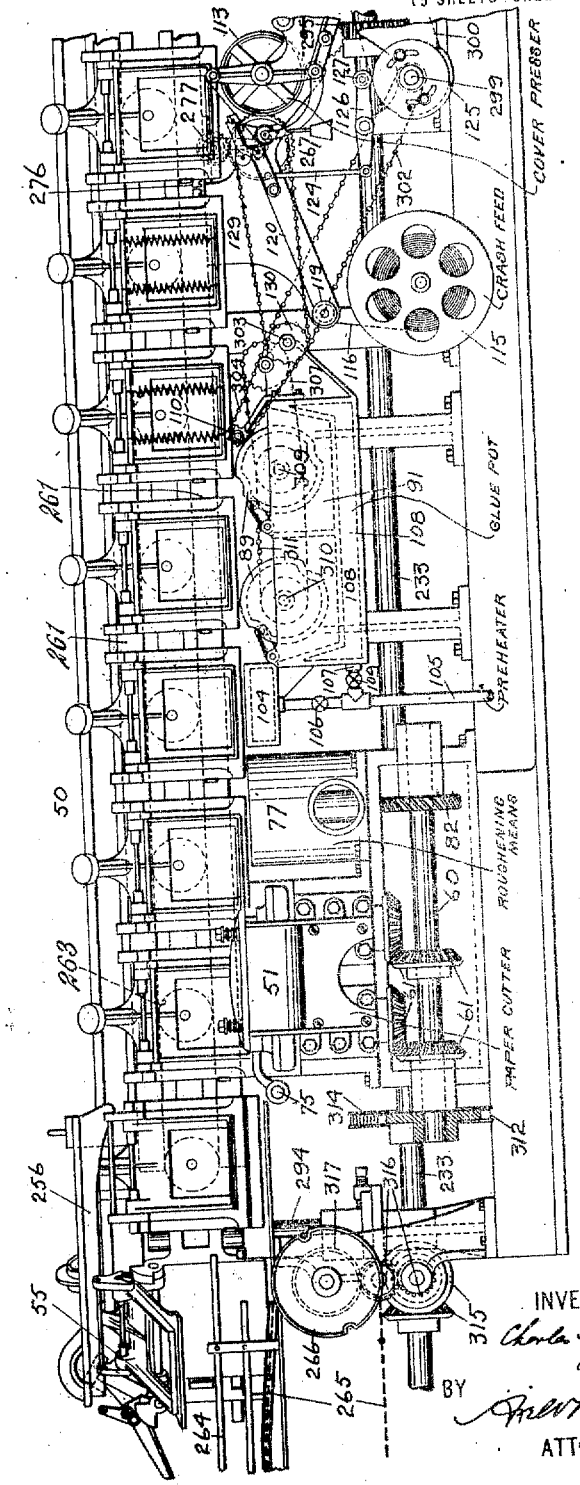
Figures 1 and 2 are side elevations which, when placed together, show one side of a machine embodying the invention.

Fig. 34ª is a detail view of a portion of the cover feeding device, showing the means for supporting the pile.

Fig. 35 is a plan view of the cover feeding device.

Fig. 36 is a view in elevation partly in section of the sheet controlled means for lifting the pile.

Fig. 37 is a view of the fluid actuating means for raising the pile, with parts broken away and in section, looking substantially in the direction of the arrow 37.

Fig. 38 is a view in vertical section of some of the parts shown in Fig. 37, the section being substantially on the line 38—38 of Fig. 36.

Fig. 39 is a detail view of the gearing for driving the fluid actuating device.

Fig. 40 is a perspective view of the intermeshing gears which cause the circulation of the fluid in the device shown in Figs. 36 to 38 inclusive.

Fig. 41 is an end elevation of the delivery mechanism and adjacent parts partly in section.

Fig. 42 is a view of the delivery mechanism, looking in the direction of the arrow 42 of Fig. 41.

Similar characters of reference indicate corresponding parts in the several views.

50 indicates a book conveyer composed of the book clamps 55 hinged together and provided with rollers 260 which travel in the upper and lower longitudinal guides 261 of the framework. (Figs. 2, 5 to 8 and 41.) At the ends of the guides 261 are upper and lower sprockets 262, after the manner disclosed in my said prior Patent No. 1,193,395, which engage the said rollers 260 to propel the conveyer. (Figs. 3 and 4.) Mounted on the links or clamps 55 of the conveyer are further the bearers 263 which travel between the upper and lower guides 261 and between the upper and lower sprockets 262, all as disclosed in my said prior application.

The book conveyer 50 is thus in the form of an endless conveyer traveling preferably with a continuous movement in a horizontal plane and arranged with two parallel sides and curved ends as shown in Figs. 3 and 4.

The machine is preferably arranged to be connected up to a signature gathering machine, from which latter the books 52 are delivered, in an upright position with their backs lowermost, by means of the guides 264 and chain 265 passing around the sprocket 266 (Figs. 1 and 3).

Arranged adjacent to one of the parallel sides of the book conveyer 50 are the various instrumentalities which act upon the books. These instrumentalities or devices are best seen in their relation to each other and to the book conveyer 50 in Figs. 1, 2, 3 and 4. As there shown, they are merely designated by a general reference character, the detailed construction being shown more clearly in the various detail views.

Accordingly arranged adjacent to the book conveyer 50 is the paper cutting device which cuts off the back of the book and is designated by the reference character 51. Next thereto follows the paper roughening device whose casing is indicated by 77. Then comes the preheating device for heating the back of the book before the adhesive is applied thereto indicated by 104, and next thereto is the adhesive applying means indicated by the rollers 89. 113 is the cover presser or drum and, interposed between it and the adhesive applying means, is the feeding means indicated by the reel 115 and the feeding and cutting device 267 for feeding the reinforcing strip to the back of the book. Located adjacent to the other end of the machine is the cover feeding device 268 from which covers are fed by means of the guides 179 and chains 177 to the cover presser 113. 269 is the cover breaking device. Adjacent to the path of the book conveyer and below the same is the shelf 270 which extends from the cover breaker around to the delivery 248 on the opposite side of the machine.

Having now obtained a general understanding of the relative location of the various mechanisms with respect to the book conveyer 50, we now proceed to a more detailed description of the machine.

Adjacent to the path of the book conveyer 50 is a paper cutting machine which is designated by the general reference character 51. (See also Figs. 9, 11, 12, 13 and 14.)

The paper cutting device is arranged to act on the book or stock 52 fed by the conveyer, preferably without stoppage of the book conveyer, and has therefore imparted to it a cutting motion toward and in the same direction as the book conveyer.

The paper cutting machine preferably has a pressure exerting means 53 and a cutting member 54. These are so arranged that the pressure exerting means 53 reaches the book clamping means 55 of the book conveyer 50 before the cutting member 54 engages the book, the cutting member 54 continuing its movement while the pressure exerting means is engaging the clamp 55 and traveling along with it.

On the other side of the path of the book conveyer is an abutment member 56 and a backing member 57. The backing member 57 coöperates with the cutting member 54, and the abutment member 56 coöperates with the pressure exerting means 53. The members 56 and 57 travel longitudinally with the book during the cutting operation, but have no transverse movement.

Various means may be provided for imparting the inward and forward motion to the cutting machine, but in the present instance an eccentric device is preferably utilized for this purpose because of its simplicity. It is preferred, however, to have but a single source of power for all of the members of the cutting machine. But inasmuch as an eccentric or crank motion imparts a variable speed, and inasmuch as the pressure exerting means must travel forward at substantially the same speed as the book conveyer, the speed of which is uniform, suitable compensating devices are utilized to permit the pressure exerting means to be driven from the crank at a uniform speed while engaging the clamping means of the book conveyer.

The preferred embodiment of the paper cutting machine is therefore as follows:

A supporting member is provided composed of two parts 58 and 59 which receives motion from the shaft 60 by means of the bevel gears 61, vertical shafts 62, disks 63 and crank pins 64. Interposed between the parts 58 and 59 is the pressure exerting member 53. The parts 58 and 59 are preferably provided with friction producing material 65, leather in the present case. Slots 66 extending on oblique lines toward the path of movement of the book are provided in the pressure exerting member and pins 67 pass loosely through the member 58 and are in threaded engagement with the member 59. Surrounding these pins are the springs 68 bearing against the member 59 and whose tension may be carried by means of the nuts 69. Where the pins 67 pass through the diagonal slots 66 they are provided with anti-friction rollers 70 of a diameter substantially equal to the width of the diagonal slots 66. The member 53 is provided with cut-away portions 71 to clear the bolts 72 which fasten the cutting member 54 to the part 58 of the supporting member. All these devices are arranged on one side of the path of the book conveyer.

On the other side of the path of the book conveyer there is arranged a guide 72ª rigidly secured in any suitable manner upon the frame of the machine and on which slides a carriage 73. Mounted on this carriage is the backing member or surface 57 and the abutment member or surface 56. Anti-friction rollers 74 are provided against which the reciprocating carriage 73 slides. Pivotally connected to the carriage 73 and 74ª is a rod 75 which extends loosely into the guides 76 carried by the pressure exerting member 53.

The rotation of the shafts 62 imparts a combined inward and forward and a combined outward and rearward movement to the parts 58 and 59 of the supporting member by reason of the disks 63 and crank pins 64. This causes the cutting member and the pressure exerting member to move toward the book conveyer and longitudinally with it. The pressure exerting member 53 will reach the clamp 55 before the cutting member reaches the book. Then, owing to the pin and slot construction, the pressure exerting member will be allowed to travel along with the book substantially at the speed of the latter. The cutting member 54 will constantly increase its speed and will finally overtake the pressure exerting member and cut the back of the book off with a shearing cut and will then recede with a gradually retarded movement. The pressure exerting member will also recede, with the cutting member until the member 53 strikes against the stop 53ª, when owing to the slot construction, the said member 53 will be brought forward of the cutting member.

Meanwhile the abutment member and the backing member will have traveled forward with the book at substantially the speed thereof, owing to the connection between the pressure exerting member and the carriage 73, and, after the book is cut, will return to their original position.

Suitable means for roughening the backs of the books or stock are provided. Preferably a horizontally rotatable roughening member is provided which is disposed underneath and adjacent to the path of the books.

In its preferred form this device, as shown in Figs. 9, 10 and 11, is constructed as follows:

77 is a casing having the open top 78 and the exit flue 79. Concentric with this casing is a vertical bearing 80 which extends partly inside the casing and partly below the same. 81 is a shaft disposed within this bearing and receiving motion from the shaft 60 by means of the spiral gears 82. Mounted adjacent to the open top of the casing on the shaft 81 is a spider 83 having an annular groove 84 in which is disposed the annular roughening member 85. This roughening member here consists of a flexible blade provided with hacksaw teeth held in position against the outer straight wall in the groove 84 by means of the annular filling member 86 whose inner surface is tapered to correspond with the taper of the inner wall of the groove 84 as shown, and secured to the spider 83 by means of screws 87. The spider 83 thus forms a holding member and in conjunction with the filling member 86 holds the flexible blade or band 85 rigidly. At the same time this construction permits a quick removal and replacement of the band 85.

The book 52 passes substantially diametrically across the face of the roughening member 85, and the back of the book is therefore progressively roughened throughout its entire length at an angle to the direction of travel of the book, and in both directions because the book encounters the saw twice at diametrically opposite points of rotation in its passage over the same. This has the effect of thoroughly roughening the back of the book.

The particles of stock removed from the book will work their way into the casing 77 through the open top thereof. If desired an exhaust (not shown) may be connected to the exit flue 79. In order to prevent the saw from displacing the sheets of the book, I may utilize the disks 88. These disks 88 are of relatively thin material and are mounted to rotate or spin on the centers 88ª at the top of the casing 77, and are so arranged that they support or confine the outer sheets of the book while the saw is roughening the back of the book.

Proper adhesive applying means (Figs. 15 and 16) are utilized in connection with the machine, which means may take many forms. I have found, if an adhesive is applied to the entire length of the back of the book, that there will be an accumulation of adhesive at the tail end of the book—a condition which is disadvantageous since the surplus tends to smear parts of the book not intended to be glued. I therefore prefer to construct the adhesive applying member in such a way that the glue is applied to the back of the book for a distance less than the entire length of the book, thereby avoiding the overplus of adhesive.

Also I provide a depressed portion in the surface of the adhesive applying member into which the accumulation of adhesive collects, and a scraper is provided which follows the contour of the adhesive applying member and removes all surplus from the same. To facilitate the application of the adhesive, and to aid in keeping it in a fluid condition while applying it to the book, I find it advantageous to heat the book before the glue is applied.

In the preferred embodiment herein disclosed these parts are constructed as follows, (Figs. 1, 3, 15 and 16:)

89 is an endless adhesive applying member here shown as a roller, suitably journaled as at 90 for rotation within the adhesive container 91. The member 89 is provided with an adhesive applying surface 92 and a depressed surface or gap 93. The surface 92 is of a length less than the length of the back of the book, or the surfaces 92 and 93 are so related circumferentially with relation to the travel of the book that the surface 92 will not contact the tail end 94 of the book (Fig. 15). The surplus adhesive will therefore collect on the surface 93 of the roller 89. The roller 89 is preferably provided with two surfaces 92 and two gaps 93.

95 is a scraper blade mounted loosely on the rock-shaft 96. Mounted fast on the rock-shaft 96 is an arm 97 and carried by the scraper 95 is also an arm 98. Interposed between the two arms is a spring 99 the tension of which may be adjusted by means of the wing nut 100. This serves to hold the scraper against the roller 89 under a yielding tension.

By varying the position of the scraper, bringing it nearer or farther away from the roller 89, the thickness of the glue film may be varied.

Connected to the rockshaft 96 is a cam follower 101 engaging the cam 102 and held thereagainst by the spring 103. As will be seen from an inspection of Fig. 15 the cam 102 is of the same contour as the roller 89, so that the scraper 95 will hug the surface of the roller 89 at all times. The adhesive applying surfaces 92 are roughened as shown in Fig. 16, while the gaps or depressed surfaces 93 are smooth. The direction of rotation of the roller 89 is shown in Fig. 15. It will now be apparent that the rotation of the roller 89 will cause its surface 92 to be scraped by the scraper 95 before glue is applied to the book and that therefore the glue will be mostly contained in the depressions of the roughened surface 92. In this way approximately the correct amount of glue will be supplied to the book. It will be further observed that the scraper 95 will remove substantially all the glue from the surface 93, and the latter will therefore readily hold any surplus glue that may be squeezed down by the book and surface 92.

Arranged adjacent to the path of the book conveyer and in advance of the adhesive applying means is a preheating member, here taking the form of a steam chest 104 over which the back of the book passes so as to heat the paper before glue is applied. Steam is supplied to this chest through the pipe 105 controlled by valve 106. A branch pipe 107 leads from the pipe 105 to the steam chamber 108 of the adhesive container for keeping the adhesive in a fluid condition. A valve 109 controls the branch pipe 107. In the present instance two rollers 89 are employed and the book may therefore be given two applications of adhesive.

If a surplus of glue has been applied to the book it sometimes happens that it will form into downwardly projecting "whiskers" or points. In order to remove this surplus there is provided a spinner 110 in rear of the adhesive applying member, below the path of the book but closely adjacent thereto. As here shown this spinner or surplus removing member is in the form of a bar mounted for rotation in the bearing 111. A chute 112 may also be provided adjacent to the bar 110 for conveying the "whiskers" back to the glue pot.

In book covering machines for covering books that have not been previously stitched, it is customary to interpose a strip of reinforcing material between the back of the book and the cover.

In the machine under consideration such means may be provided, to properly coöperate with the traveling book conveyer and the endless cover presser or cover drum 113. It is convenient to feed the reinforcing means in the form of a web of material and to provide a cutting device for severing the web. Means are also provided for interrupting the feed of the web when the cutting device acts to sever said web. The parts are further so arranged that the reinforcing strip and the cover are applied simultaneously to the book. This is accomplished by feeding the reinforcing material and the cover in between the book and the cover presser, or, to state it differently, by feeding the reinforcing strip in between the cover and the book. In this manner the book may be continuously moved, if desired, while applying the reinforcing material and the cover.

In the preferred form herein disclosed in Figs. 1 and 17 to 20 inclusive these parts are arranged as follows:

113 is an endless cover presser, here shown in the form of a drum to which a cover 114 is fed by any suitable means—preferably by the means hereinafter described. 115 indicates a rotatable reel for holding a web 116 of reinforcing material, like crash or cheese cloth. Above the same are two feed rolls 117 and 118 adjacent to the path of the book conveyer. Between these two rolls the web 116 is led by means of the idler 119 and guides 120. The roll 117 is mounted to rotate freely upon the stud 120ª fixed in the frame of the machine while the roll 118 is mounted on the rocker arm 121 extending rigidly from the sleeve 122 rotatable on the fixed stud 123. Connected to the arm 121 is a rod 124 which extends downwardly and is actuated from the cam 125 by means of the beam 126 having the cam roller 127. Carried by each of the rolls 117 and 118 is a sprocket wheel 128. A sprocket chain 129 is trained from the sprocket 130 around the idler 131 and then in opposite directions around the wheels 128 and thence back to the wheel 130. In this way the proper rotation is given to the rolls 117 and 118, the separation of the said rolls from one another while remaining in rotative engagement with the drive chain 130 being also permitted by this construction.

Mounted underneath the path of the web 116 and transversely thereof is a stationary cutting member 131. Located above the path of the web 116 and extending transversely thereof is movable cutting member 132. This member 132 is mounted on the rocking support 133 and is normally held out of engagement with the web by means of the spring 134. Connected to the rocking sleeve 122 is an extension 135 having a bifurcated end 136 which engages the end of the cutting member 132.

It will now be apparent that the rotation of the rolls 117 and 118 will feed the web forward in between the book and the cover presser and that the latter will apply both progressively to the book as the latter passes over the cover presser. At the proper time in the cycle of operations the cam 125 will actuate the sleeve 122 whereby the cutting member 132 will sever the web, and at the same time the rolls 117 and 118 will become separated, thereby interrupting the feed of the web.

The cover may be fed to the cover presser or drum by any suitable means. I have however, devised a new and improved sheet separating and feeding means which may be advantageously used in connection with and as a part of the book covering machine.

A combing wheel is employed which is adapted to support a pile of sheets, and means are provided for lifting the pile off the combing wheel in rear of the lowermost sheet so that the said lowermost sheet may be readily withdrawn while the pile is lifted. Preferably the advance of the lowermost sheet is utilized to control the actuation of the pile lifting means. The pile-lifting means really constitute a sheet feed interrupting means, and it is preferred to actuate this device hydraulically, and to have the sheet actuate a valve controlling the hydraulic device. Means are also provided for supporting the rear end of the pile independently of the combing wheel, and for this purpose I utilize a hopper and suitable means for adjusting the same.

Figure 2:
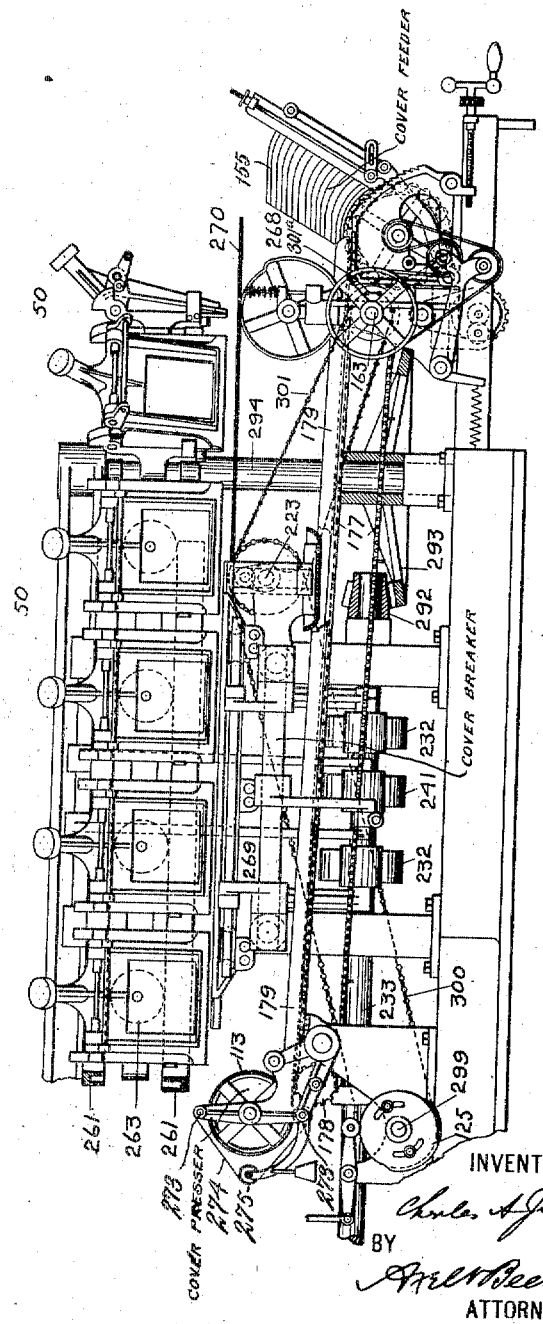

The preferred embodiment of this device is shown in Figs. 2, 34, 34ª, 35, 36, 37, 38, 39 and 40.

137 is a combing wheel suitably mounted on the shaft 138 of the carriage 139. This carriage 139 is slidable upon the bed as shown by means of ears 140, screws 141 and handle 142. The two screws 141 are connected by means of the sprocket chain 143. Mounted on the carriage 139 are two arms 144 pivoted at 145 and connected at their free ends by means of the bar 146. Rising from and pivoted upon the bar 146 are two inclined arms 147 also connected by a cross bar 148. Mounted upon the bars 146 and 148 are plates 149 which form a support for the rear edge of the pile. Carried by the two outer plates 149 are lugs 150 through which pass threaded rods 151 which carry at their lower ends transverse pins 152 extending in through the slots 153 in the plates 149 and are provided with the supporting ledges 154 which extend underneath the pile 155, and, in conjunction with the plates 149 constitute a hopper for supporting the rear of the said pile 155. The forward end of the pile 155 is supported on the combing wheel, and it will be noted that the top of the combing wheel is higher than the ledges 154 so that the pile 155 assumes a flexed position. The position vertically of the ledges 154 can be varied by means of the lugs 150 and rod 151.

Connected to the bar 146 are the links 156 provided with the pawls 157 and having slotted plates 158 engaging with pins 159 on the arms 147. The pawls 157 are adapted to engage with the racks 160 on the carriage 139. Handles 161 are provided in connection with the pawls 157.

By the above means the hopper may be adjusted around the center 145 to bring the pile more or less over the combing wheel, and also to set the device for various lengths of sheets.

The combing wheel may be driven by any suitable means, but preferably it is driven from a pulley 162 on the shaft 163 of one of the feeding-out rollers. Mounted on the pivot 164 is a bracket 164$^a$ normally held in one position by means of the spring 165. This bracket carries two idlers 166, and a belt 167 is trained from the pulley 162 around one of the idlers 166, around the pulley 168 of the combing wheel, around the other idler 166 back to the pulley 162. When the carriage 139 is adjusted toward and away from the feeding-out rollers, the bracket 164$^a$ and spring 165 will cause the idlers 166 to maintain the belt 167 taut.

169 and 170 indicate two feeding-out rollers mounted fast respectively on the shafts 163 and 171. Motion is imparted to the shaft 163 by suitable means, and a chain 172 (Fig. 39) imparts motion from the gear 173 on the shaft 163 to the gear 174 on the shaft 171 and to the gear 175 on the shaft 176. Chains 177 extend from the shaft 163 up to the sprockets 178 adjacent to the cover presser (Fig. 2). These chains pass over idlers 177$^a$ mounted loosely on shaft 163 and are not driven from the latter, but from the cover presser. Guides 179 extend parallel to these chains 177, to support the side edges of the sheet, from a point adjacent to the combing wheel 137 to a point adjacent to the cover presser, and the chains 177 are provided with pins 180 to propel the sheet to the cover presser after it has been fed out by the feeding-out rollers 169 and 170. The latter (170) of these is provided with a high point 181 which coacts with the other roller 169 to feed the sheet out to the chains 177. Mounted on the fixed beam 182 are the brakes or retarding members 183 which rest on top of the pile.

Suitable means for lifting the pile off the combing wheel 137 are provided consisting here of lifting members 184 adjustably mounted on the arms 185 by means of set screws 186 and slots 187. The arms 185 are mounted on the rockshaft 188 of the carriage 139 and the said rockshaft is rocked by the actuating connection 189 having a shoe-like extension over the plunger 190 and pivotally connected to the rockshaft 188 by means of the arm 191 and to the stud 192 of the carriage 139 by means of the link 193. It follows that when the actuating connection 189 is lifted by the plunger 190, the lifting member 184 will lift the pile off the combing wheel 137.

The rockshaft 188 consists of two independent members, and the means for lifting the pile are in duplicate, one on each side of the machine, so that each side of the pile may be elevated independently of the other. This enables a crooked sheet to be acted upon by the combing wheel for a longer period on one side than on the other.

The plunger 190 is preferably actuated in the following manner: 194 is a casing provided at its lower end with a passage 195 extending up to the valve 196 in the partition 197 separating the passage 195 from the upper end of the casing. The valve 196 is normally held in its open position by gravity, but is connected by the stem 198 and link 199 to the arm 200 mounted on the rockshaft 201. The rockshaft 201 has the controller finger 202 projecting into grooves 203 in the friction roller 169 and when a sheet of paper reaches the said controller finger 202 it is lifted and the rockshaft 201 is thereby turned and the valve 196 is lifted and closed. Adajacent to the casing 194 is a cylinder 204 constituting a bypass around the partition 197 when the valve 196 is closed by reason of the openings 205 and 206. The plunger 190 is mounted in the cylinder 204. Mounted in the lower end of the casing 194 are two pinions 207 intermeshing with each other and driven from the shaft 176 by means of the sprockets 208, 209 and chain 210. The casing 194 is filled with a suitable liquid, and the rotation of the pinions 207 forces the liquid through the passage 195, past the valve 196 and back to the casing 194. This connection thus constitutes a liquid circuit. When this takes place the plunger 190 is in the position shown in Fig. 37 and the port 205 is closed by the said plunger 190. If now the valve 196 is closed (Fig. 38) the liquid will pass through the port 206, raise the plunger 190 and uncover the port 205. This will permit the liquid to pass back into the casing 194 and will, at the same time, elevate the plunger 190, thereby raising the actuating connection 189. As soon as the controller finger 202 drops again the valve 196 will be opened thereby relieving pressure on the plunger 190 and lowering the pile on the combing wheel 137. I prefer, however, to provide the pinion 207 with cut-out portions 211 (Fig. 40) so that irrespective of the position of the sheet the pressure in the casing 194 will drop and the plunger 190 and valve 196 will therefore descend.

The combing wheel will comb the sheets forwardly, and when the lowermost sheet reaches the controller 202 the pile will be lifted off the combing wheel. The feeding-out rollers 169 and 170 will now take hold of the sheet and feed it forwardly onto the chains 177. The pile will now descend on the combing wheel again and the operation will be repeated.

The cover presser 113 (see particularly Figs. 32 and 33) is substantially of the construction disclosed in my prior Patent No. 1,193,395. Mounted upon the shaft 271 which carries the cover presser 113 are rings 272 between which and the rollers 273 the tapes 274 pass, said tapes returning over the idlers 275. The cover passes from the chains 177 in between the tapes 274 and rings 272, and thus under and up over the cover presser 113 which latter presses the cover progressively into contact with the reinforcing strip 116 and with the back of the book. Means are provided for causing the cover and the book to travel at the same rate of speed as they are to be associated, and, to this end, each clamp or link 55 is provided with a rack 276, (Figs. 1, 6, 7, 8, 32 and 33) with which engages an auxiliary driving device. As shown, a gear 277 is arranged adjacent to the cover presser and adapted to engage with each rack 276 as each link 55 passes by. The gear 277 imparts motion to the shaft 271 by means of gears 278, 279 and pinion 280. Shaft 271 also carries gear 282 which drives the gear 281 carried on the same shaft 178ª as the sprockets 178, which latter in turn drives chains 177. By this means the cover is fed in at substantially the same speed as that of the advancing book.

The cover breaking device may assume many forms, but preferably it is constructed as shown in Figs. 21 to 31 inclusive, as follows:

212 is a supporting member here shown as a bar extending longitudinally below the path of the book conveyer and adjacent thereto, such member being adapted to be reciprocated in a line parallel to the path of travel of the book. Rigidly mounted on said support and extending longitudinally substantially from end to end thereof is a central backing member 213. Arranged on opposite sides of said support 212 and extending longitudinally thereof are cover breaker members having flat top plates 214 each raised slightly above the central backing member 213, and fixed upon brackets 214' which latter are slidably mounted on pins 215 suitably fixed as by the sleeves 215' to the support 212 and extending horizontally at right angles thereto so that the cover breakers 214 may be given a transverse reciprocation. The brackets 214' may also carry a pair of intermediate pins 216 each of which is fixed in one member 214 and has a sliding fit in a corresponding opening in the other member 214. Springs 218 bearing at opposite ends against the respective members 214' normally tend to separate the cover breakers transversely from one another. Mounted on the brackets 214' through the medium of the vertical pins 220 are grooved rollers or wheels 219. Secured at one end to the bar 212, as shown most clearly in Fig. 27, is an extension 221 having a vertical slot 222. Fixed in any manner to the frame of the machine is a bracket 225 having its outer end in the form of a guide 226 in which a foot or slide 227 on the extension 221 engages.

This bracket 225 also carries a rotatable member 223 which may be a stub shaft or the like and which is provided with a crank arm 224 whose end engages through suitable means in the slot 222. As the crank 224 is rotated the support 212 is reciprocated, carrying with it the cover breakers 214.

The support 212 is slidingly mounted in the bushings 228 of the arms 229, which latter are in turn carried by a rockshaft 230 extending longitudinally adjacent to the cover breaking device and carried by means of studs 230ª in suitable bearings 231 on the framework. This rockshaft 230 is actuated by the cams 232 on the cam shaft 233 by means of levers 234 and rolls 235.

In this way the backing member 213 and the cover breaking members 214 are given an upward movement.

Mounted on either side of the cover breaking members 214 and extending longitudinally thereof are two rockshafts 236 and 237 having swinging levers 238 and 239 connected together by the rod 240, said levers being actuated by the cam 241 and cam roll 242. Below the rockshaft 236 and pivoted to the lever 238 are links 243. Above the rockshaft 237 and pivoted to the levers 239 are links 244. The links 243 and 244 carry the longitudinally extending members 245 adapted to engage the rollers 219 and to permit the latter to roll along the same, so that when the rockshafts 236 and 237 are actuated the cover breaking members 214 are moved transversely toward each other.

As the book conveyer reaches the cover breaking devices, the latter are lifted and the backing member 213 is given an upward movement (Figs. 24 and 25). Simultaneously therewith the support 212 is given a longitudinal movement in the same direction as the book conveyer by means of the crank 224. The cover breaking members 214 now move inwardly toward each other and break the cover (Fig. 26).

The precise means for delivering the finished books may vary, but in the present instance these means take the following form, (see Figs. 41 and 42:)

Located adjacent to the path of the book conveyer, below the same and extending transversely away therefrom, is an inclined delivery chute 247. Located adjacent to this chute and moving transversely to the longitudinal book conveyer is a delivery conveyer 248. In the present instance, this consists of an endless apron 249 passing over the sprockets 250, one of which is conveniently driven by means of the ratchet 251 and pawl 252, whereby an intermittent progressive motion is imparted to said delivery conveyer. The pawl 252 may be operated by any suitable means, such as the eccentric 253 and rod 254.

Carried by the endless apron 249 are leaves 255, which at a certain point in the revolution of the conveyer assume an inclined position forming substantially a continuation of the chute 247. The parts are so timed that at the end of each intermittent motion a leaf will be in an inclined position adjacent to the chute, so that when the cam 256 opens the clamp of the book conveyer the book will slide down the chute 247 whereby its covers will be closed up by the said chute 247 and the roller 257, and the delivery conveyer will thereafter remove the book in an upright position as shown.

The construction of the book conveyer may vary, but as shown in Figs. 5 to 8 inclusive, each link 55 takes the following form:

283 is a stationary member to which is pivoted the movable member 284. Pivoted upon the movable member 284 at 285 is a bell crank 286 having at one end a roll 287 adapted to engage with the cam 288 on the stationary member and having at its other end 289 a spring 290 connected to the movable member. Normally gravity automatically moves the movable member to its closed position with respect to the stationary member and the roll 287 passes in under the cam 288 (Fig. 8) thus constituting a latch which locks the movable member in its closed position. When pressure is applied to the extension 291 of the movable member by means of the cam 256 (Figs. 1, 3 and 4) the bell crank 286 will swing around its center 285 and release the roll 287 from underneath the cam 288 and the continued movement of 291 will thereafter swing the movable member 284 outwardly, the roll 287 traveling over the upper surface of the cam 288.

The gearing for driving the various parts of the machine may be arranged in any suitable manner, but preferably it is constructed as follows:

A main shaft 233 extends lengthwise of the machine (Figs. 1, 2, 3 and 4), this main shaft being provided with a bevel gear 292 which drives the bevel gear 293 on one of the two upright shafts 294 carrying the sprockets 262 (Figs. 2 and 4). In this way motion is imparted to the book conveyer 50. The shaft 233 also carries the cams 232 and 241 of the cover breaker.

Mounted on the shaft 233 (Fig. 3) is a spur gear 295 which meshes with another spur gear 296 having a bevel 297 meshing with the bevel 298 on the main cross shaft 299 (Figs. 1, 2 and 3). This shaft 299 carries the cam 125 for actuating the cutting and feeding device of the reinforcing strip mechanism 267. A chain 300 (Fig. 2) connects shaft 299 with the shaft or rotating member 223 of the cover breaker. From 223 extends another chain 301 to sprocket 301ª of the shaft 163 of the cover feeding device (Fig. 2).

From shaft 299 runs another chain 302 to the shaft 303 carrying the sprocket 130 (Figs. 1, 3 and 17). From shaft 303 runs a sprocket chain 304 to the shaft or spinner 110 of the glue pot (Figs. 1, 3, 15 and 16). The shaft 303 also carries a spur gear 305 meshing with another spur gear 306 (Fig. 3) from which extends the chain 307 to the sprocket 308 on the shaft 309 (Figs. 1, 3 and 16) of one of the glue rollers 89. Motion is transmitted from 309 to the shaft 310 of the other glue roller 89 by means of sprocket chain 311.

The shaft 60 which drives the paper cutting and roughening device receives its motion by means of the sprocket 312, chain 313 and sprocket 314 on the main shaft 233 (Figs. 1 and 3). The sprocket 266 (Fig. 1) for driving the chains 265 receives its motion from shaft 233 by means of bevel gears 315, pinions 316 and gear 317. The eccentric 253 (Fig. 41) for driving the delivery is mounted direct on shaft 233.

In the operation of the machine, the books are received in an upright position from the guides 264 and are brought in under the clamps 55 of the book conveyer 50. The movable member 284 of the clamp is in its open position owing to the engagement of the extension 291 with the cam 256. As the conveyer travels forward, the cam 256 tapers off, (Fig. 3) closing the clamp on the book and carrying the same past the various instrumentalities previously described. After the cover is applied the book cover rests or drags on the shelf 270 until it comes opposite the delivery chute 247 when the cam 256 again opens the clamp 55 and discharges the book 52. The cam 256 extends around the end of the conveyer as shown in Fig. 3 and the clamps 55 are held open until another book 52 is ready to be taken from the guides 264.

The following cases have been divided out of this application: An application for sheet feeding machine, Ser. No. 855647, filed Aug. 7, 1914; an application on adhesive applying device, filed Aug. 7, 1914, Ser. No. 855644; an application on delivery mechanism, filed Aug. 7, 1914, Ser. No. 855,640; Patent No. 1195926 of Aug. 22, 1916 on web feeding and cutting device; Patent No. 1200200 of Oct. 18, 1916 on paper cutting machine; Patent No. 1215547 of Feb. 13, 1917 on conveyer.

What is claimed is:

1. A book covering machine comprising: a longitudinally moving book conveyer for holding a book with its back exposed, in combination with means for roughening the back of the book by acting upon it in different directions, including: an annular roughening member disposed adjacent to the conveyer and extending across its path at two points, and means for rotating the roughening member.

2. A book covering machine comprising: a book conveyer for holding a book with its back exposed, a cover presser adjacent to the path of the exposed back, means for feeding a cover to the cover presser, and means for feeding a strip of reinforcing material, between the cover and the book, to the cover presser.

3. A book covering machine comprising: a book conveyer holding a book in an upright position with its back exposed, in combination with means for simultaneously applying a strip of reinforcing material and a cover to the back of the book including: a cover presser adjacent to the path of the conveyer, means for feeding a cover to the cover presser, and means for feeding a strip of reinforcing material, on top of the cover, to the cover presser.

4. A book covering machine comprising: a longitudinally moving book conveyer for holding a book with its back exposed, a cover presser adjacent to the path of the exposed back of the book, means located on one side of the cover presser for feeding a cover thereto in a direction opposite to that of the direction of movement of the conveyer, and means located on the other side of the cover presser for feeding a strip of reinforcing material thereto in a direction substantially the same as the direction of movement of the conveyer.

5. A book covering machine comprising: a longitudinally moving book conveyer for holding a book with its back exposed, and means for simultaneously applying a reinforcing strip and a cover, in superimposed relation with respect to each other, to the back of the book when the conveyer is moving the book.

6. A book covering machine comprising: a longitudinally moving book conveyer for holding a book with its back exposed, a cover presser adjacent to the conveyer, means for feeding a cover to the cover presser, means for supplying reinforcing material in web form, means for feeding the web to the cover presser and superimposing said reinforcing material on the cover, and means for severing the web into strips.

7. A book covering machine comprising: means for holding a book with its back exposed, a cover presser adjacent to the holding means, means for feeding a cover to the cover presser, and means for feeding reinforcing material lengthwise of the back of the book to the cover presser and superimposing said reinforcing material on the cover carried by the cover presser.

8. A book covering machine comprising: means for holding a book with its back exposed, and means for simultaneously applying a strip of reinforcing material and a cover, in superimposed relation to each other, to the back of the book.

9. A book covering machine comprising: a book conveyer having a longitudinal movement, a cover feeder, and means for driving the cover feeder from the book conveyer.

10. A book covering machine comprising: a book conveyer having a longitudinal movement, a cover presser, and means for driving the cover presser from the book conveyer.

11. A book covering machine comprising: a book conveyer having a longitudinal movement, a cover presser, a cover feeder delivering a cover to the cover presser, and means for driving the cover presser and cover feeder from the book conveyer.

12. A book covering machine comprising: a longitudinally moving book conveyer, a rotatable cover drum, a rack on the book conveyer, and means for rotating the cover drum from the rack on the conveyer.

13. A book covering machine comprising: a longitudinally moving book conveyer, a rotatable cover drum, a cover feeding belt, and means for driving the cover drum and the belt from the conveyer.

14. In a book covering machine, a book conveyer, a rotatable cover presser, means for imparting movement to the book conveyer, and complementary devices on said book conveyer and cover presser interengaging at times to insure a uniform rate of motion of such cover presser and book conveyer.

15. In a book covering machine, a cover breaking device vertically movable and having a slot extending vertically, a rotating member, a crank on said rotating member engaging said slot to impart a reciprocating motion to the cover breaking device irrespective of its said vertical movement, and means for lifting and lowering the cover breaking device.

16. In a book covering machine, two oppositely disposed cover breaking members adapted to be moved toward and away from each other, means for reciprocating said cover breaking members at an angle to their movement toward and away from each other, and actuating members parallel to the cover breaking members movable toward and away from the cover breaking members to actuate the latter and along which said cover breaking members reciprocate.

17. In a book covering machine, a vertically movable support, two oppositely disposed cover-breaking members mounted on said support to move toward and away from each other, rockshafts extending parallel to the cover breaking members, means for rocking said rockshafts, means carried by said rockshafts for moving the cover breaking members toward and away from each other, another rockshaft extending parallel to the cover breaking members, means connecting said other rockshaft with the support to lift and lower the same, and means for rocking said other rockshaft.

Signed at New York, in the county of New York and State of New York, this 22nd day of September, A. D. 1918.

CHARLES A. JUENGST.

Witnesses:
 AXEL V. BEEKEN,
 TERESA V. LYNCH.

DISCLAIMER.

1,244,861.—*Charles A. Juengst*, Croton Falls, N. Y. PAMPHLET-COVERER. Patent dated October 30, 1917. Disclaimer filed April 8, 1919, by the assignee, *American Assembling Machine Company*, patentee and former assignee assenting.

Enters this disclaimer—

"To those claims in the said specification which are in the following words, to wit:

"Claim 15. In a book covering machine, a cover breaking device vertically movable and having a slot extending vertically, a rotating member, a crank on said rotating member engaging said slot to impart a reciprocating motion to the cover breaking device irrespective of its said vertical movement, and means for lifting and lowering the cover breaking device.

"Claim 16. In a book covering machine, two oppositely disposed cover-breaking members adapted to be moved toward and away from each other, means for reciprocating said cover breaking members at an angle to their movement toward and away from each other, and actuating members parallel to the cover breaking members movable toward and away from the cover breaking members to actuate the latter and along which said cover breaking members reciprocate.

"Claim 17. In a book covering machine, a vertically movable support, two oppositely disposed cover-breaking members mounted on said support to move toward and away from each other, rockshafts extending parallel to the cover breaking members, means for rocking said rockshafts, means carried by said rockshafts for moving the cover breaking members toward and away from each other, another rockshaft extending parallel to the cover breaking members, means connecting said other rockshaft with the support to lift and lower the same, and means for rocking said other rockshaft."

[*Official Gazette April 15, 1919.*]